May 30, 1950     T. T. WOODSON     2,509,753
FILTER SYSTEM FOR WASHING MACHINES AND THE LIKE
Filed Feb. 24, 1947     2 Sheets-Sheet 1

Inventor:
Thomas T. Woodson,
by Alfred V. Bobst.
His Attorney.

Inventor:
Thomas T. Woodson,
by Alfred E Bobst
His Attorney.

Patented May 30, 1950

2,509,753

UNITED STATES PATENT OFFICE 2,509,753

FILTER SYSTEM FOR WASHING MACHINES AND THE LIKE

Thomas T. Woodson, Bridgeport, Conn., assignor to General Electric Company, a corporation of New York Application February 24, 1947, Serial No. 730,307

3 Claims. (Cl. 68—23)

The present invention relates to clothes washing machines of the type wherein during washing the cleansing liquid is circulated continuously through the basket or receptacle in which the washing operation is being performed and wherein a filter is provided at the rim of the basket for removing lint, curd, and other foreign matter from the liquid.

Heretofore, so far as I am aware, the filter has been in the form of an annular screen positioned at the rim of the basket above the normal level of the cleansing liquid in the basket, the cleansing liquid being discharged onto the screen from a radially directed nozzle at the end of a hose, the hose in turn being connected to a circulating pump. The nozzle discharges onto the screen at one point and the liquid tends to flow in both directions circumferentially around the screen. When the filter is clear, the liquid passes through the screen in the immediate vicinity of the nozzle. As this portion of the screen becomes clogged with lint, scum and other material, the liquid flows farther and farther away from the nozzle before it passes through the screen until eventually it flows all the way around, building up a uniform layer of lint, etc. around the entire screen, thus uniformly clogging the screen. Such filter screens have given considerable trouble. If a fine mesh screen is used (for example, a mesh of the order of 1/64") it soon becomes clogged or blocked with lint, etc. so that the filter ceases to function. If a coarser mesh screen is used (for example, a mesh of the order of 1/16"), the lint catches on the wire of the screen and forks or wraps around it to an extent such that it is difficult to remove, it having to be picked or scrubbed off.

The object of my invention is to provide an improved filter system or arrangement of the above-referred to type which overcomes the above enumerated difficulties, and for a consideration of what I believe to be novel and my invention, attention is directed to the following specification and to the claims appended thereto.

Figure 1:
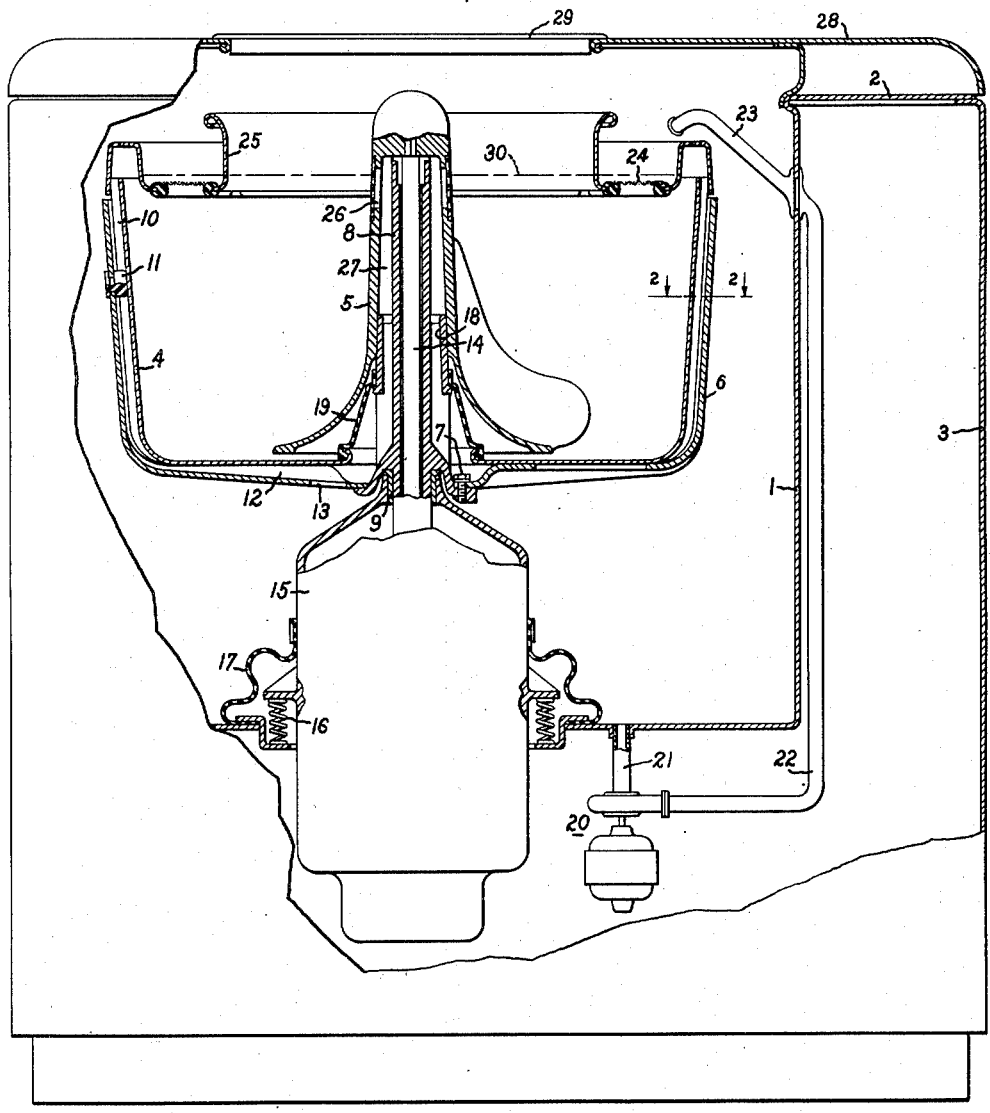
Figure 2:
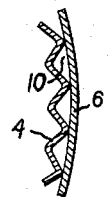
Figure 3:
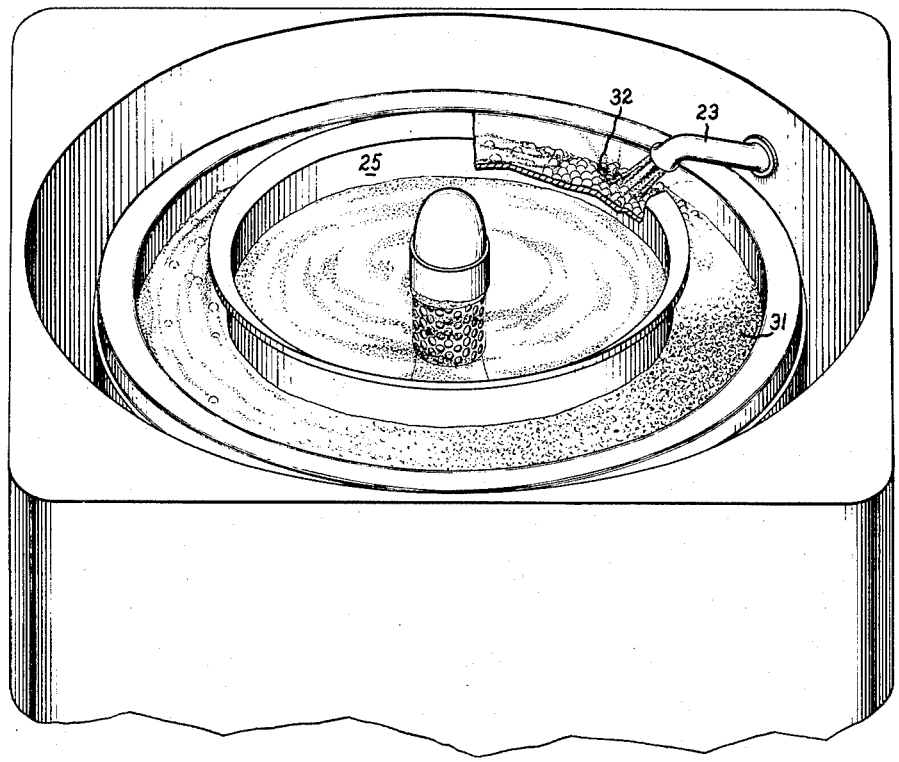
Figure 4:
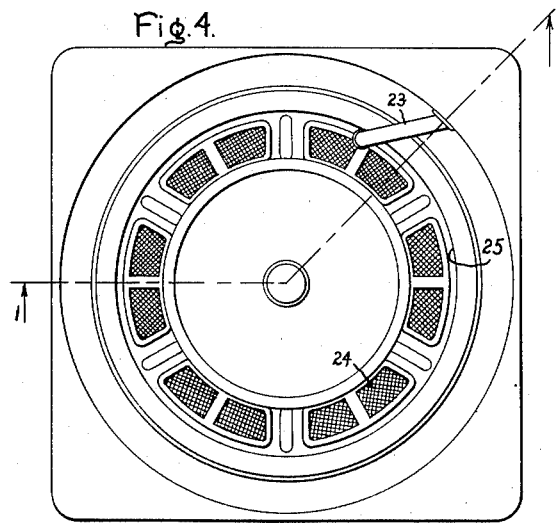

In the drawing, Fig. 1 is a sectional view, partly diagrammatic, taken on line 1—1 of Fig. 4, of a clothes washing machine embodying my invention; Fig. 2 is a detail view on line 2—2, Fig. 1; Fig. 3 is a perspective view showing particularly the filter ring and illustrating its operation, and Fig. 4 is a top plan view.

Referring to the drawing, 1 indicates a tub of a washing machine having an outturned integral flange 2 at its upper end by which the tub is supported on an inturned flange at the upper edge of an outer casing 3. In tub 1 is a spin basket 4 in which is an agitator 5. The spin basket is preferably corrugated as shown in Fig. 2 and is carried in a balancing ring 6 which in turn is attached, as indicated at 7, to a tubular shaft 8 supported in bearing sleeve 9. Basket 4 is positioned in spaced relation to ring 6 to provide a water flow channel means 10 between the side wall of the basket and the side wall of the ring. It is held in such spaced relation by a number of spacing members 11 positioned around the basket. As shown in Fig. 4, casing 3 is rectangular and the tub is circular. At their lower ends, channels 10 communicate with passages 12 between the bottom of basket 4 and the bottom wall of ring 6, which passages in turn lead to openings 13 in the bottom wall of the ring. This basket and balancing ring construction is more fully disclosed and claimed in my application Serial No. 730,309, filed February 24, 1947, and assigned to the same assignee as the instant application. Agitator 5 is carried by and suitably attached to the upper end of a shaft 14 positioned inside the tubular shaft 8. Shafts 8 and 14 extend down into a casing 15 and at their lower ends are attached to mechanism in casing 15 for oscillating the agitator for washing, the basket then being held stationary, and for spinning the basket for centrifugally extracting water from the clothes, the agitator then turning with the basket. Bearing sleeve 9 is carried in the top wall of casing 15. The mechanism in casing 15 for oscillating the agitator and spinning the basket may be of any suitable type. For example, it may be a mechanism such as that disclosed and claimed in my patent application, Serial No. 551,096, filed August 25, 1944. Casing 15 may be supported on the bottom of tub 1 in any suitable manner. In the present instance, it is shown as being supported by a plurality of compression springs 16. At 17 is a flexible sleeve for sealing the connection between casing 15 and the bottom of tub 1. The lower end of agitator 5 is journaled on the outside of a stationary sleeve 18 supported on tubular shaft 8 and between it and basket 4 is a sealing sleeve 19. At 20 is an electric motor driven circulating pump having its inlet connected by a conduit 21 to the bottom of tub 1 and its outlet connected by a conduit 22 to a discharge nozzle 23 which discharges to a filter screen 24. Filter screen 24 is located at the bottom of an annular trough 25, U-shaped in cross section, supported on the top edge of basket 4. It may be attached thereto by welding or otherwise. During washing, at which time basket 4 is stationary, pump 20 during all or part of the washing period pumps cleansing liquid from the bottom of tub 1 onto the screen 24, the liquid flowing through the screen and then overflowing from the basket back to the tub. Two paths for overflow are shown. One path is over the top edge of basket 4, down through channel means 10 between the basket and the balancing ring and thence through passages 12 and openings 13 to the tub. The other path is through elongated slots 26 to the agitator post, annular space 27 between the agitator post and shaft 8 and the passages 13 in the bottom of the balancing ring 6. Elongated slots 26 and the top edge of basket 4 define the normal liquid level limits in the basket. At 28 is a cover for casing 3 having a central opening closed by a lid 29 through which clothes may be placed in the basket.

The structure so far described does not form part of my present invention and is to be taken as typical of any suitable washing machine wherein during washing the cleansing liquid is circulated during all or part of the washing period and passed through an annular filter screen. In this connection, it is to be understood that pump 20 has a capacity such that it supplies water at a rate to maintain within limits the desired water level in the basket. The rate of discharge from nozzle 23 is substantially greater than the flow capacity of the annular passage between sleeve 18 and shaft 8 and the water level within the basket 4 therefore rises until the spillover point is reached.

According to my invention, I so position the filter that the filter screen 24 is below the normal level of the cleansing liquid in the tub as defined by the overflow, said level being indicated by dot and dash line 30. In addition, I preferably arrange nozzle 23 so that it discharges liquid onto the screen at an angle to the radius, i. e., tangentially. By this arrangement, I have found that during washing, when the agitator is in operation, spanking of the liquid in the basket from below against the underside of the screen, which spanking is effected by movement of the liquid set up by the agitator, serves to keep the lint in a fuzzy state over the screen and prevent it from settling down on the screen; and with the discharge nozzle arranged at an angle to the screen, the tangential velocity of the liquid in the annular screen channel continuously moves the lint around as far as the velocity persists. With little lint on the screen, this velocity is dissipated in the first quadrant due to the ease with which the liquid penetrates the screen. As more and more lint is accumulated on the screen, the liquid flows further and further around the screen before all its velocity is dissipated until eventually the velocity is maintained entirely around the screen. As the quantity of lint increases, the action of the liquid stores the lint just behind the rear of the nozzle and keeps adding to the pile around the ring toward the point of impact of the liquid discharged through the nozzle on the screen. This is illustrated in Fig. 3 wherein the lint 31 is shown as being accumulated in considerable quantity just to the rear of nozzle 23 and as decreasing in quantity in a clockwise direction around the trough toward the point of impact of the liquid stream with the screen at 32; this in contradistinction to an arrangement wherein the filter is above the water level in which case the filter becomes uniformly clogged. By my invention, I have found in actual practice that from 10 to 20 times more lint can be stored on my below-liquid-level filter before the filter becomes clogged to an extent such that it is ineffective than can be stored on the known above-liquid-level filter. In terms of time, I have found that with comparable loads of clothes and comparable mesh screens, a below-liquid-level screen will remain effective some 20 times longer than an above-liquid-level screen.

In machines of the type to which my invention is particularly applicable, it is the practice during spinning to supply water through the nozzle for flushing or rinsing. In this connection, it is advantageous to so arrange nozzle 23 that it faces in the direction of rotation of the basket, which is counter-clockwise as shown in Fig. 3. With this arrangement during flushing, when the basket is up to speed, the relative motion of the water with respect to the filter is backwards, i. e., opposite that when the basket is stationary. As a result, the flushing water serves to strip lint off the wires and other parts of the filter rather than forking it tighter or embedding it in the mesh of the filter.

While I have illustrated and described my invention as applied to a clothes washing machine, it having particular utility in such a machine, it is to be understood that it is not limited thereto necessarily and that it may be used wherever found applicable.

What I claim as new and desire to secure by Letters Patent of the United States, is:

1. In a washing machine, a tub, a basket in the tub, washing means in the basket, walls forming cleansing liquid overflow passage means which defines the liquid level in the basket and through which liquid overflows to the tub during the washing operation, an annular trough at the upper end of the basket having a filter screen in its bottom wall, a pump for continuously circulating liquid from the tub to said trough, means supporting said trough with respect to said liquid passage means so that the filter screen during washing is positioned below the liquid level in the basket defined by said overflow passage means, and a discharge nozzle arranged angularly with respect to said screen through which the pump discharges liquid into said annular trough.

2. In a washing machine, a tub, a basket in the tub, washing means in the basket, walls forming cleansing liquid overflow passage means which defines the liquid level in the basket and through which liquid overflows to the tub during the washing operation, an annular trough at the upper end of the basket having a filter screen in its bottom wall, a pump for continuously circulating liquid from the tub to said trough, means supporting said trough with respect to said liquid passage means so that the filter screen during washing is positioned below the liquid level in the basket defined by said overflow passage means, and a discharge nozzle through which the pump discharges liquid into said annular trough.

3. In a washing machine of the type wherein the washing operation is performed in a spin basket which basket is rotated to centrifugally extract liquid from the clothes, the combination of a tub, a spin basket in the tub, walls forming liquid overflow passage means which defines the liquid level in the basket and through which liquid overflows to the tub during the washing operation, an annular trough at the upper end of the basket having a filter screen in its bottom wall, a pump for continuously circulating liquid from the tub to the trough, means supporting said trough with respect to said liquid passage means so that the filter screen during washing is positioned below the liquid level in the basket defined by said overflow passage means, and a discharge nozzle arranged angularly with respect to the plane of said screen and in a direction to discharge liquid onto the screen in the direction of rotation of the spin basket.

THOMAS T. WOODSON.

REFERENCES CITED

The following references are of record in the file of this patent:

UNITED STATES PATENTS

| Number | Name | Date |
|---|---|---|
| 1,135,080 | Vandercook | Apr. 13, 1915 |
| 2,279,878 | Suits et al. | Apr. 14, 1942 |
| 2,421,242 | Clark | May 27, 1947 |